(12) United States Patent
Cocchi et al.

(10) Patent No.: US 11,399,552 B2
(45) Date of Patent: Aug. 2, 2022

(54) STIRRING DEVICE OF A MACHINE FOR MAKING LIQUID OR SEMI-LIQUID FOOD PRODUCTS

(71) Applicant: ALI GROUP S.R.L.—CARPIGIANI, Cernusco sul Naviglio (IT)

(72) Inventors: Andrea Cocchi, Calderara di Reno (IT); Roberto Lazzarini, Reggio Emilia (IT)

(73) Assignee: ALI GROUP S.R.L.—CARPIGIANI, Cernusco sul (IT)

(*) Notice: Subject to any disclaimer, the term of this patent is extended or adjusted under 35 U.S.C. 154(b) by 267 days.

(21) Appl. No.: 16/737,605

(22) Filed: Jan. 8, 2020

(65) Prior Publication Data

US 2020/0221726 A1 Jul. 16, 2020

(30) Foreign Application Priority Data

Jan. 11, 2019 (IT) .................. 102019000000511

(51) Int. Cl.
| | | |
|---|---|---|
| *B22C 5/00* | (2006.01) | |
| *A23G 9/22* | (2006.01) | |
| *A23G 9/12* | (2006.01) | |
| *B01F 27/091* | (2022.01) | |
| *B01F 27/072* | (2022.01) | |
| *B01F 27/1143* | (2022.01) | |
| *B01F 101/13* | (2022.01) | |

(52) U.S. Cl.
CPC .............. *A23G 9/224* (2013.01); *A23G 9/12* (2013.01); *B01F 27/0724* (2022.01); *B01F 27/091* (2022.01); *B01F 27/1143* (2022.01); *B01F 2101/13* (2022.01)

(58) Field of Classification Search
CPC .......................... A23G 9/12; B01F 27/1143
See application file for complete search history.

(56) References Cited

U.S. PATENT DOCUMENTS

| | | | | | |
|---|---|---|---|---|---|
| 2,576,995 | A | * | 12/1951 | Carvel ................ | A23G 9/224 366/310 |
| 5,312,184 | A | * | 5/1994 | Cocchi ................ | A23G 9/224 62/343 |
| 2014/0000302 | A1 | | 1/2014 | Cocchi et al. | |
| 2017/0042180 | A1 | | 2/2017 | Bush | |

FOREIGN PATENT DOCUMENTS

| | | | | | |
|---|---|---|---|---|---|
| DE | 3000882 | A | * | 7/1980 | ............ A23G 9/12 |
| EP | 3195924 | A1 | * | 7/2017 | ............ A23G 9/224 |
| EP | 3195924 | A1 | | 7/2017 | |
| FR | 2216011 | A1 | | 8/1974 | |

OTHER PUBLICATIONS

Google machine translation for "DE-3000882-A" (Year: 1980).*
Italian Search Report dated Aug. 27, 2019 from counterpart Italian App No. IT 2019000000511.

* cited by examiner

*Primary Examiner* — Anshu Bhatia
*Assistant Examiner* — Gregory Y Huan
(74) *Attorney, Agent, or Firm* — Shuttleworth & Ingersoll, PLC; Timothy J. Klima

(57) ABSTRACT

A machine used for making liquid or semi-liquid food products, specifically ice cream, comprises a container for processing liquid or semi-liquid base products by means of a stirring device driven by a motor. The stirring device comprises an external mixing structure to which a shaft is fixed so that the motor can drive it in rotation. Keyed to the shaft are scraping elements which scrape the product off the inside walls of the processing container.

7 Claims, 8 Drawing Sheets

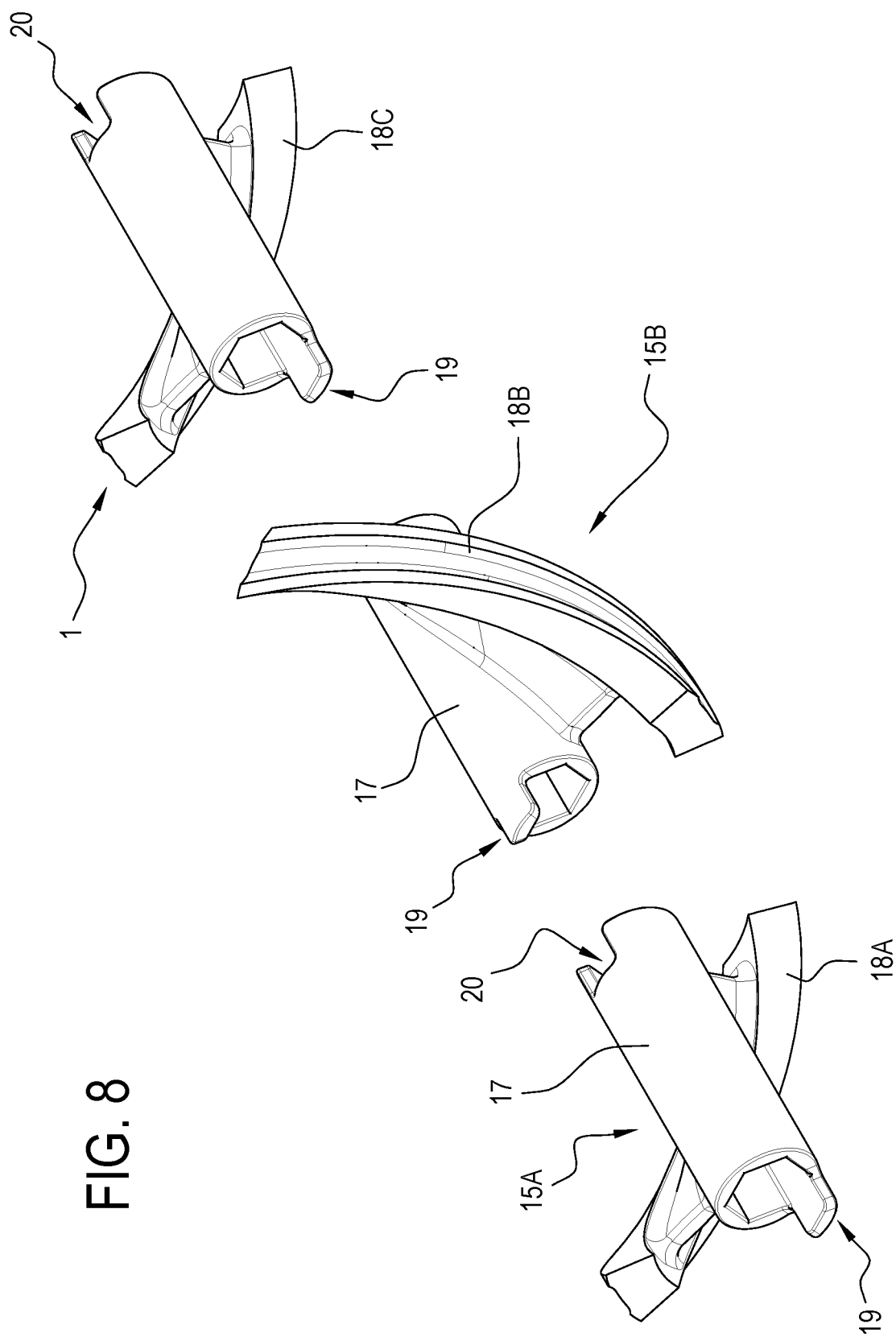

STIRRING DEVICE OF A MACHINE FOR MAKING LIQUID OR SEMI-LIQUID FOOD PRODUCTS

This application claims priority to Italian Patent Application 102019000000511 filed Jan. 11, 2019, the entirety of which is incorporated by reference herein.

BACKGROUND OF THE INVENTION

This invention relates to a stirring device for a machine for processing and dispensing to the public liquid or semi-liquid food products, in particular, but without thereby losing in generality, for the production of sorbets, ice creams, soft-serve ice creams and the like.

More specifically, this invention relates to a stirrer designed to be mounted in the aforesaid machine for making liquid or semi-liquid food products of this kind.

Known in the prior art are machines for making and dispensing liquid and semi-liquid products, in particular ice cream, frozen dessert creams and the like. The machines are equipped with a container which is used for processing the liquid or semi-liquid product and which is generally associated with a thermal treatment system which in turn comprises at least one heat exchanger made around the container itself.

For simplicity, reference will hereinafter be made to an ice cream machine which is possibly, but not necessarily, also equipped with means for dispensing the product made, without thereby limiting the scope of the invention to this specific example.

As is known, in an ice cream machine, the basic ingredients needed to make the product are placed in a container for mixing and the mixture is then transferred into the processing container by means of a pump.

This invention addresses the stirring device mounted inside the processing container.

The stirring device is of fundamental importance for obtaining a high quality product.

In the prior art machines, the device comprises a rotary element provided with radial blades and mounted with its axis of rotation parallel to the longitudinal extension of the processing container.

The stirrer scrapes the inside surface of the container.

It is evident that every container length requires a stirring element of corresponding length.

Another drawback of prior art stirring devices is that the stirring element tends to wear over time and must be replaced.

This operation is complex because it means dismantling part of the machine and also cost-intensive because it requires a lot of time and because of the cost of the component itself.

SUMMARY OF THE INVENTION

The aim of this invention is to provide a stirring device of new design, which is less expensive and easily adaptable to processing containers of different sizes.

Another aim of the invention is to provide a stirring device that is easier to replace when the scraping parts are worn, thus reducing the time and costs involved in restoring the machine for making liquid or semi-liquid products to full service.

Yet another aim of the invention is to provide a technical solution which allows these aims to be achieved in a simple yet effective manner without negatively affecting production and maintenance costs.

Lastly, this invention has for an aim to provide a machine for making liquid or semi-liquid products which incorporates the stirring device made in accordance with the invention.

According to the invention, these aims are achieved by a machine for making liquid or semi-liquid food products and comprising the technical features set out in one or more of the appended claims.

BRIEF DESCRIPTION OF THE DRAWINGS

The features of the invention, with reference to the above aims, are clearly described in the claims below and its advantages are more apparent from the detailed description which follows, with reference to the accompanying drawings which illustrate a preferred, non-limiting embodiment of the invention by way of example. In particular:

FIG. 8 shows the scraping elements that will be associated with the external mixing structure of FIG. 7 by means of the central supporting structure of FIG. 5.

DESCRIPTION OF THE PREFERRED EMBODIMENTS

Figure 1:
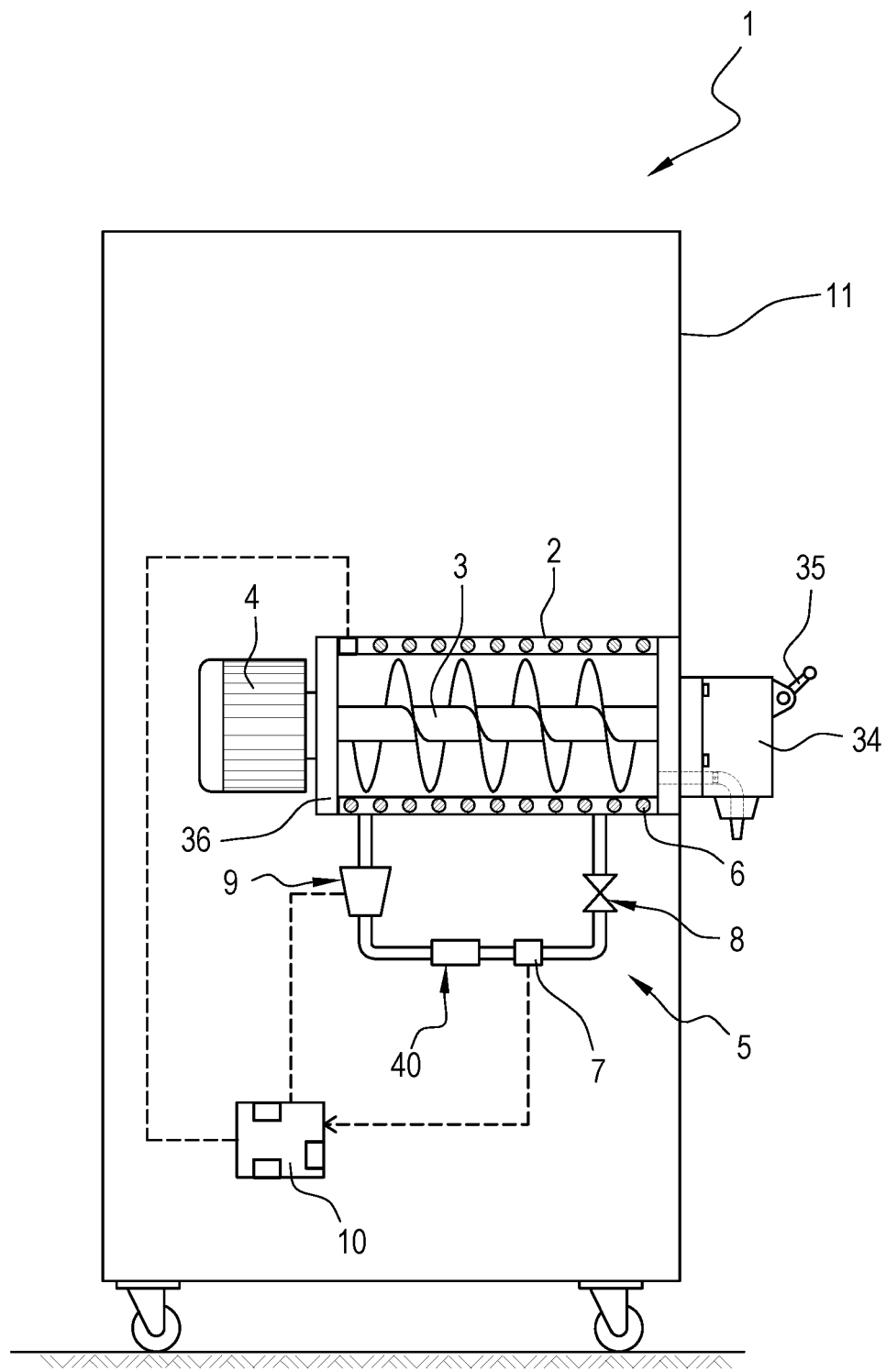
FIG. 1 schematically illustrates a machine which can incorporate the object of this disclosure in an exemplary embodiment for making and dispensing liquid and semi-liquid products such as ice cream, for example.

With reference to FIG. 1, the numeral 1 denotes a machine used for the production of liquid or semi-liquid food products, specifically ice cream, sorbets, frozen dessert creams and the like.

For simplicity, the description below refers only to the production of ice cream, it being understood that this shall not in any way be construed as limiting the scope of the invention.

In FIG. 1, the machine as a whole is schematically represented showing only its outer casing 11 (frame 11) and some of its basic parts, useful for understanding the invention, it being understood, however, that this illustration refers to an example embodiment and is in no way intended as limiting the scope of the invention.

In FIG. 1, the stirrer is illustrated schematically.

The machine of FIG. 1 also comprises a control unit 10.

Processing the liquid or semi-liquid base products inside the container 2, which essentially constitutes a batch freezing process (cooling and simultaneously stirring), allows obtaining ice cream as the finished product.

For this purpose, the container 2 is internally provided with a stirring device 3 that is driven by drive means 4 for stirring the mixture made up of the liquid or semi-liquid base products. Looking in more detail, the drive means 4 comprise an electric motor whose rotor is connected directly to the stirring device 3.

Thus, the stirring device 3 is driven in rotation by the rotor of the motor 4.

In the example embodiment illustrated, the axis of rotation of the motor and that of the stirring device 3 are connected to each other and coaxial: a different configuration between the motor and the stirring device 3 is also imaginable, however.

Continuing with the description of the machine 1, a refrigerating system 5 is provided which is connected to a heat exchanger 6 associated with the processing container 2.

The function of the refrigerating system is to cool the mixture made up of the liquid or semi-liquid base products inside the container 2 until it freezes while it is simultaneously being stirred.

The refrigerating system comprises, for example, a further heat exchanger 40, one or more valves 8 and a compressor 9 which causes the refrigerant fluid to circulate through the system 5. These components are illustrated schematically and not in detail.

The refrigerating system 5 may also comprise a sensor 7, configured to detect a parameter of the heat exchanger fluid (temperature or pressure, for example). Preferably, the sensor 7 is connected to the control unit 10.

The heat exchanger 6 to which the system 5 is connected may consist of a duct that is wound around the outside surface of the container 2 and connected to the refrigerating system 5.

The refrigerating system 5 contains a heat exchanger fluid.

The finished product can be distributed for consumption through dispensing means 34, 35, comprising a dispenser 34, which allows withdrawing a measured quantity of ice cream by operating a lever 35.

All is controlled by the control unit 10 which coordinates the operation of the drive means 4—that is, of the motor—to determine the direction of rotation and the different operating speeds of the stirrer 3.

According to the invention, the stirring device 3 of the machine 1 comprises an external mixing structure 12, rotatably mounted inside the container 2 by means of a central mounting element 13.

The central mounting element 13 is rotatably connected to the rear wall 36 of the processing container 2.

The external mixing structure 12 is fixed to the central mounting element 13.

The part of the mounting element 13 that remains outside the rear wall 36 is connected to the rotor of the motor 4, directly or indirectly, to allow driving the stirring device 3.

Figure 5:
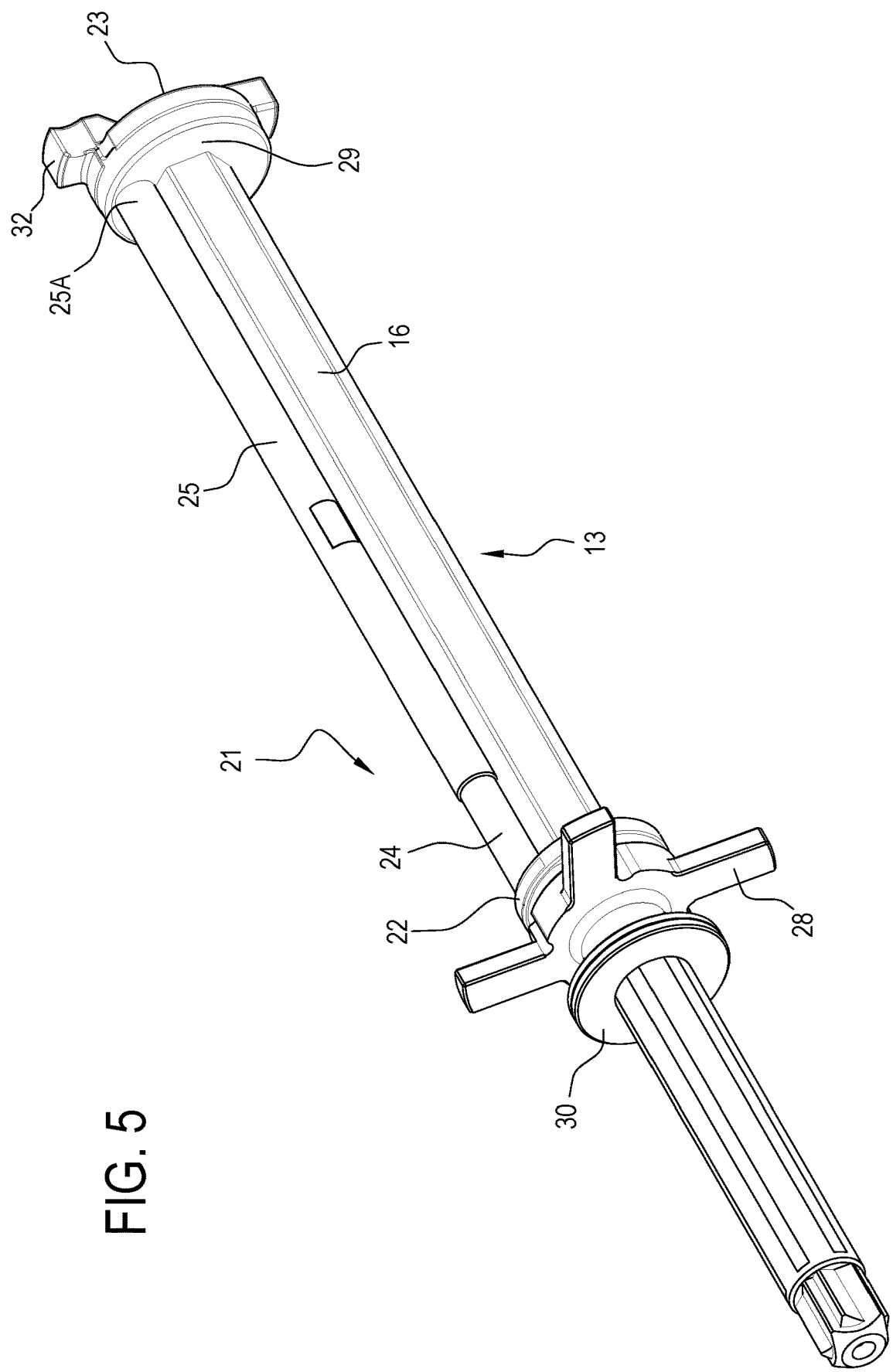
FIG. 5 shows the central mounting element of the stirring device of this invention.
Figure 6:
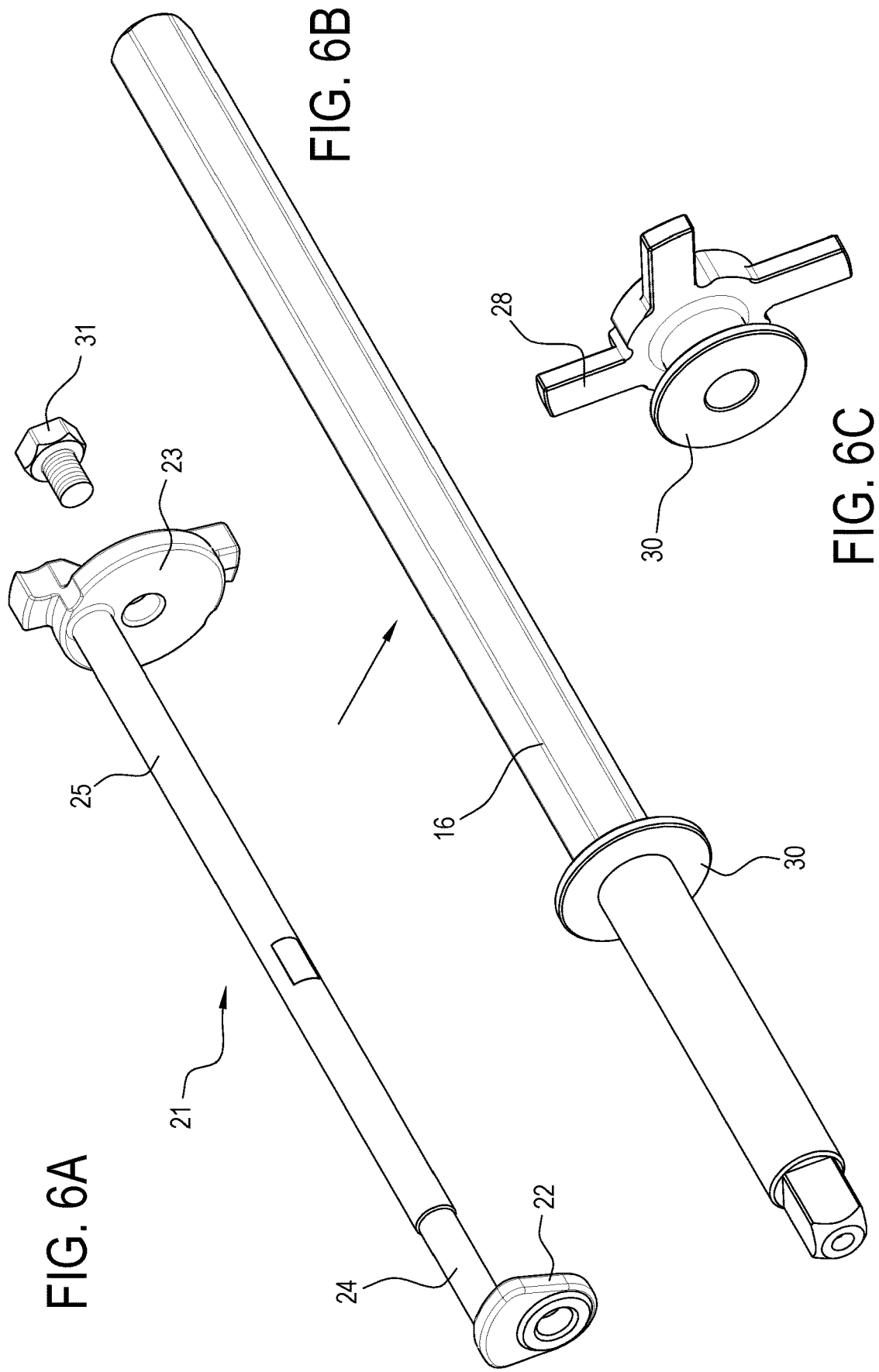
FIGS. 6A, 6B and 6C show some of the components of FIG. 5, separated from each other.

Looking in more detail, the central mounting structure 13 comprises a shaft 16 (FIGS. 2 and 5) which, for most of its length, or even for only some stretches of it, has a prismatic cross section (FIG. 6B).

Figure 2:
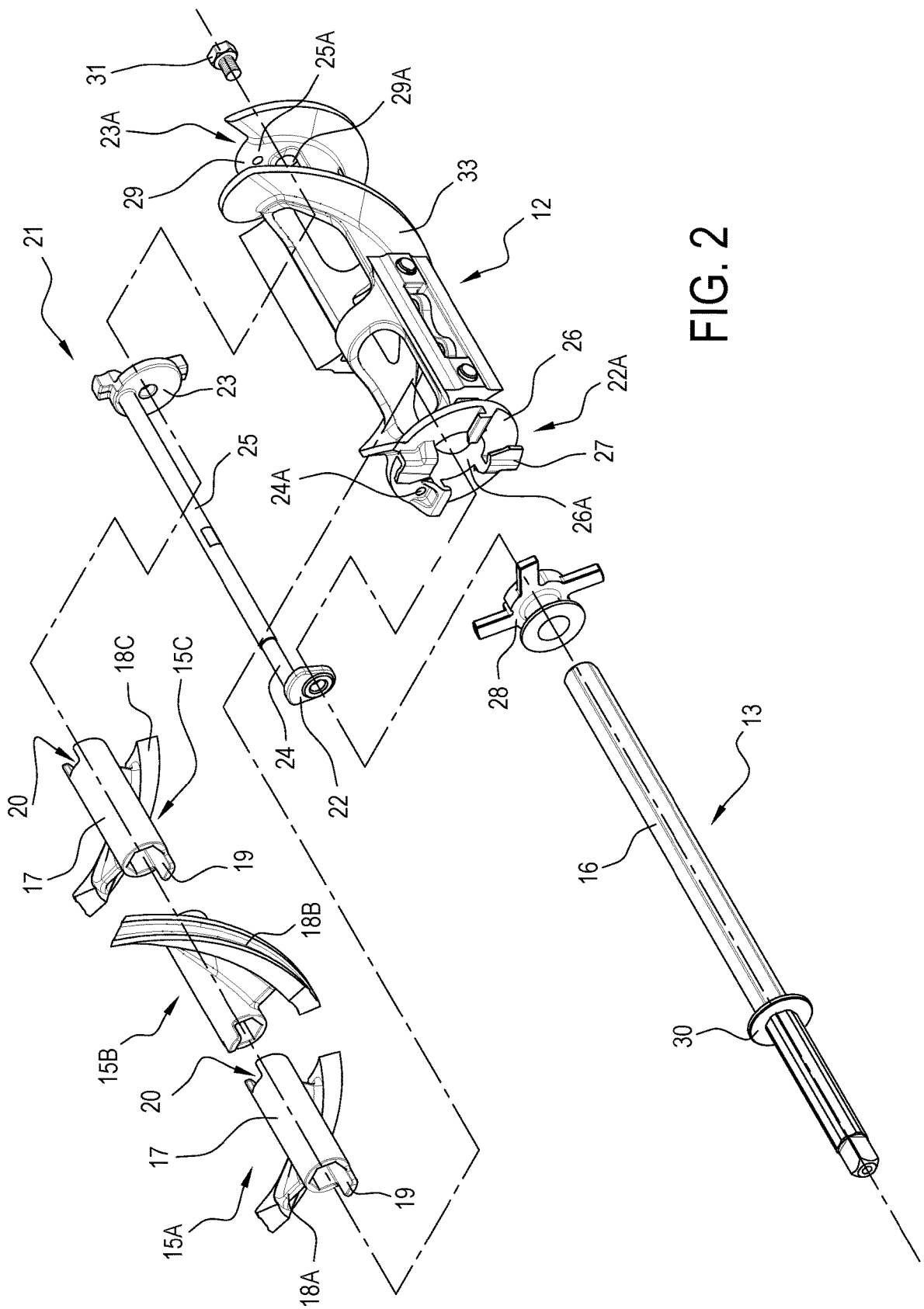
FIG. 2 shows an exploded view of the stirring device of this invention.
Figure 4:
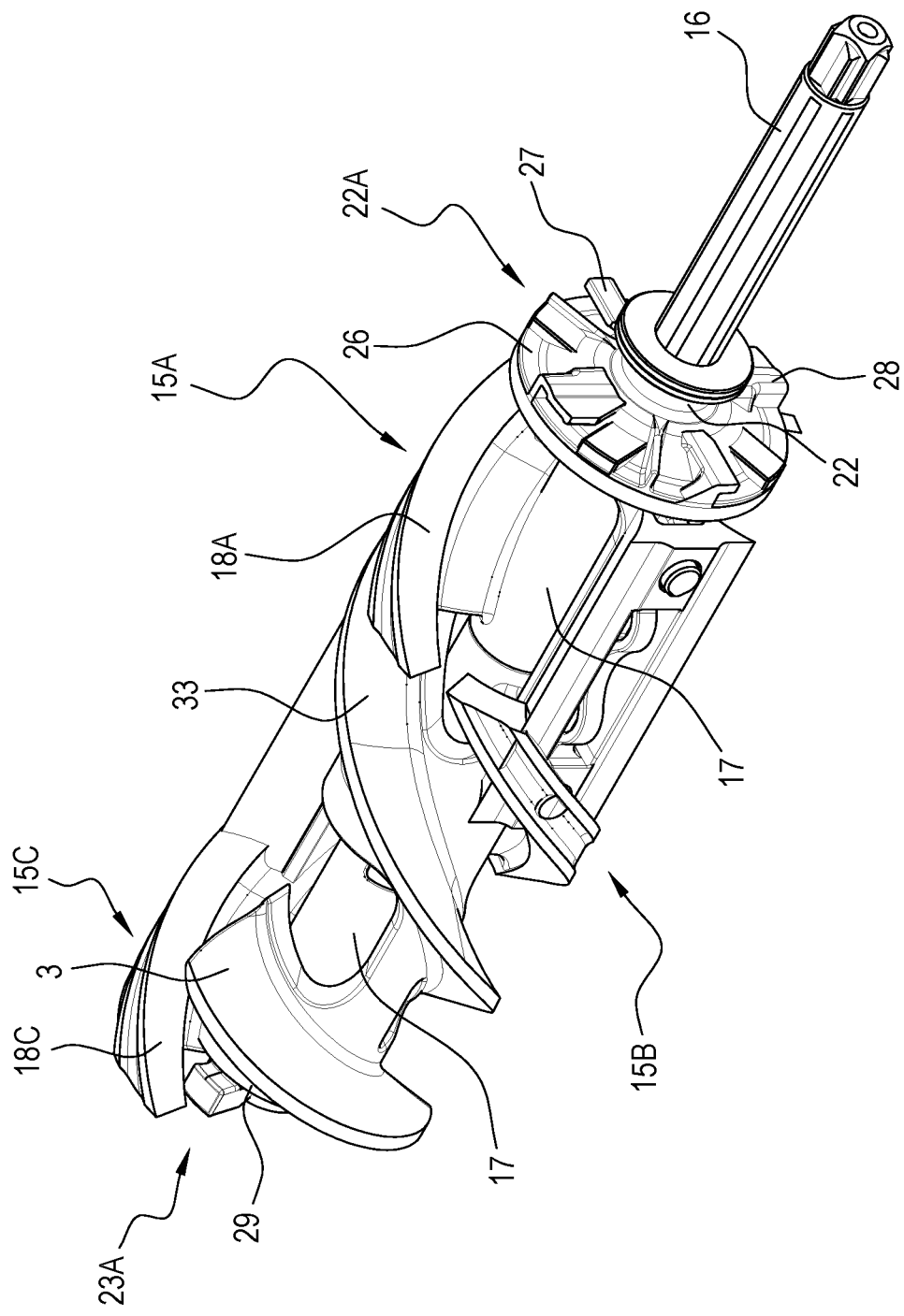

A first end of the shaft 16—the one which, in the (non-limiting) example described here, is the part that remains outside the container 2—passes through a first hole 26A made in a first extremity 22A of the external mixing structure 12 (FIGS. 2 and 4).

The first extremity 22A of the external mixing structure 12 comprises a first perforated plate 26 bearing a series of protuberances 27.

A star-shaped element 28 (FIG. 6C) is keyed to the shaft 16.

The star-shaped element 28 engages the protuberances 27 in order to transmit the rotational motion imparted by the motor 4 to the shaft 16 of the external mixing structure 12.

Figure 3:
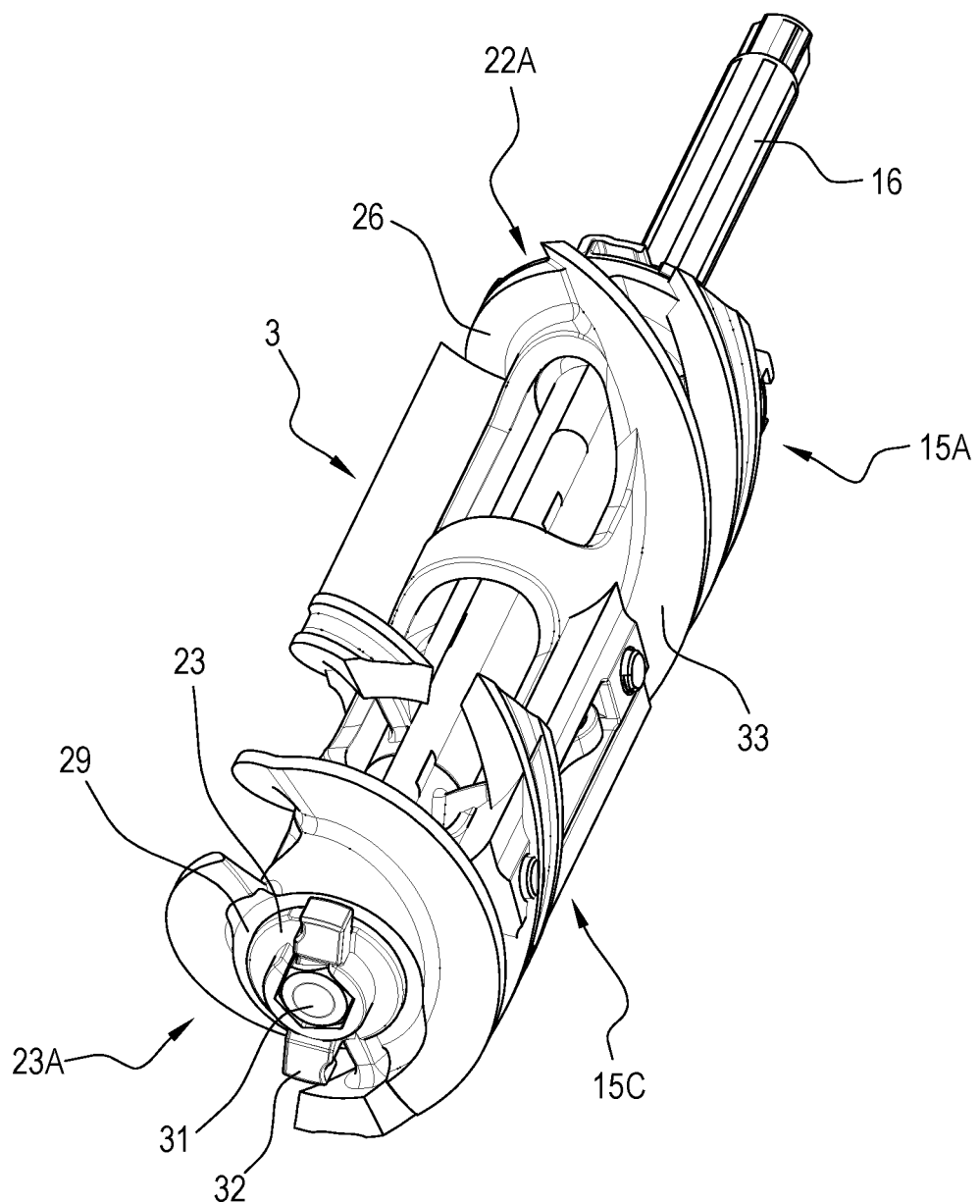
FIGS. 3 and 4 show the stirring device of this invention viewed from two different angles, when assembled, in order to better illustrate the two extremities of the device.

On the other hand, a second end of the shaft 16, opposite to the first end, passes through a second hole 29A made in a second extremity 23A of the external mixing structure 12 (FIGS. 2 and 3).

Figure 7:
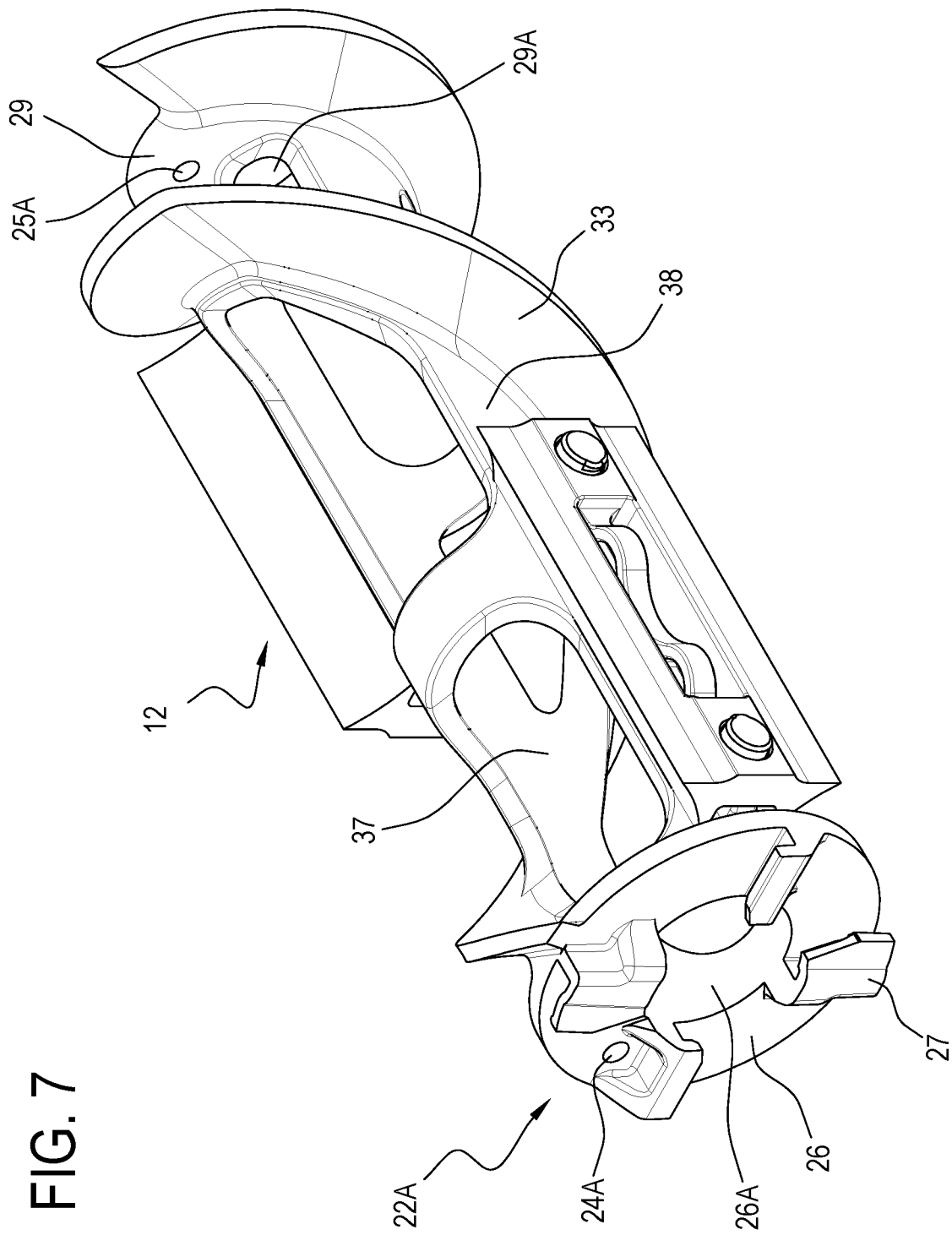
FIG. 7 shows the external mixing structure of the stirring device of this invention.

The second extremity 23A of the external mixing structure 12 comprises a second perforated plate 29 which is joined to the first perforated plate 26 by one or more segments 37, 38 (FIG. 7) which, if necessary, may be rounded in cross section.

Extending around the segments 37, 38 there is at least one helical element 33, adapted to facilitate moving and stirring the liquid or semi-liquid product inside the container 2 when the external mixing structure 12 is rotated.

Thus, the external mixing structure 12 possesses an almost ideally cylindrical shape.

The shaft 16 is then inserted with its second end through the star-shaped element 28, which remains constrained to it in rotation, through the first hole 26A of the first perforated plate 26 and then through the second hole 29A of the second perforated plate 29, until a shoulder ring 30 fixed to the shaft pushes the star-shaped element 28 against the first perforated plate 26, thereby engaging the radial arms of the star-shaped element 28 with the protuberances 27 of the first perforated plate 26.

The second end of the shaft 16 is then fixed to the second perforated plate 29 as described in more detail below.

While the shaft 16 is being inserted into the first hole 26A and the second hole 29A of the first and second perforated plates 26 and 29, the scraping elements 15A, 15B, 15C are keyed to the shaft 16 and thus remain positioned between the first and second perforated plates 26 and 29.

The scraping elements 15A, 15B, 15C are removably connected to the shaft 16, with its prismatic cross section, by a prismatic coupling.

It should be noted that in the example embodiment described here, there are three scraping elements 15A, 15B, 15C but any different number of scraping elements is imaginable—for example, two or four—depending on the length of the container 2 and hence of the stirring device 3.

Each scraping element 15A, 15B, 15C has an at least partly helical shape, as clearly shown in FIGS. 2 and 8, and comprises a tubular portion 17 whose polygonal inside cross section matches the prismatic cross section of the shaft 16.

This shape match allows connecting the scraping element by a prismatic coupling to the shaft 16, thus creating a rotational constraint between them.

A helical stretch 18A, 18B, 18C designed to scrape the inside surface of the container 2 is fixed to (formed as one with) the tubular portion 17.

As may be clearly inferred from the drawings, each of the tubular portions 17 has at least one protrusion 19 on the edge of one extremity of it and at least one indentation 20 on the other extremity of the tubular portion 17.

The cross section and position of the indentation 20 match those of a protrusion 19 situated along the edge of the corresponding extremity of an adjacent scraping element 15A, 15B, 15C.

The protrusion 19 of a tubular portion 17 is thus intended to be inserted snugly into the indentation of an adjacent tubular portion 17, thereby connecting the former to the latter.

That way, a single solid structure is created between the tubular portions 17 lined up along the shaft 16, hence between the scraping elements 15A, 15B, 15C.

To lock and compact the scraping elements 15A, 15B, 15C along the shaft 16, locking and compacting means 21, shown in FIGS. 2 and 6A, are provided to act from opposite sides on the opposite extremities of the outermost scraping elements 15A, 15B, 15C keyed to the shaft 16.

Looking in more detail, the locking and compacting means 21 comprise a flat, perforated element 22 joined to a perforated disc 23 by means of a rod 24 which is slidably inserted into a tube 25 fixed to the perforated disc 23 (FIG. 6A).

The first end of the shaft 16 is made to pass through the hole of the flat element 22 and while the shaft 16 is being inserted into the first hole 26A of the first perforated plate 26, the rod 24 is inserted into a lateral hole 24A of the first extremity 22A, that is, of the first perforated plate 26.

On the opposite extremity, the tube 25 is inserted into a lateral hole 25A of the second extremity 23A, that is, of the second perforated plate 29, thereby sliding it over the rod 24.

When the shoulder ring 30 comes into abutment against the star-shaped element 28 from the outside on the first extremity 22A of the external mixing structure 12, and the perforated disc 23 is abutted against the second extremity 23, that is, against the second perforated plate 29, the perforated disc 23 is fastened to the second end of the shaft 16, which passes through the second hole 29A, by means of a screw 31, which passes through the hole of the perforated disc 23 and engages a threaded hole (not shown in the drawings) made in the second end of the shaft 16 to fix and tighten the locking and compacting means 21, as well as the shaft 16 itself.

The scraping elements 15A, 15B, 15C remain positioned between the first and the second extremity 22A and 23A of the external mixing structure 12, rotationally constrained to each other and to the shaft 16.

To tighten the screw 31, there is a butterfly element 32 which is associated with the perforated disc 23 and which engages the head of the screw 31.

After tightening the screw 31, a single assembly is formed by the external mixing structure 12, by the shaft 16 passing through it, by the scraping elements 15A, 15B, 15C and by the locking and compacting means 21.

This assembly is first of all easily adaptable to the different sizes of the processing container, since the parts of it most exposed to wear—that is, the scraping elements 15A, 15B and 15C—have a modular structure.

Thus, depending on the length of the processing container, and hence of the stirring device, the scraping elements can be mounted in different numbers and different combinations.

This translates as lower production costs.

Moreover, wear of the scraping parts can be remedied more easily because, if necessary, only a single worn scraping part can be replaced:

it is sufficient to undo the fastening screw, pull the external mixing structure off the shaft, remove the element or elements to be replaced and mount the replacement element or elements.

This possibility constitutes a major advantage because it considerably reduces the time and costs involved in restoring the machine for making liquid or semi-liquid products to full service.

The technical solution adopted is simple but effective and smart and does not negatively affect production and maintenance costs.

What is claimed is:

1. A stirring device for a machine for making liquid or semi-liquid food products, where the machine comprises a container for processing a liquid or semi-liquid product, the stirring device being, in use, mounted inside the container to stir the liquid or semi-liquid product that is inside the container; the stirring device comprising:
    a central mounting element;
    an external mixing structure rotatably mounted inside the container and fixed to the central mounting element;
    at least one scraping element having an at least partly helical shape and being keyed to the central mounting element;
    wherein the central mounting element comprises a shaft with an at least partly prismatic cross section is prismatic on which the at least one scraping element is fitted by prismatic coupling to the shaft;
    wherein the at least one scraping element includes a plurality of scraping elements each having an at least partly helical shape and being keyed one after the other to the central mounting element;
    a locking and compacting mechanism acting on an outermost one of the scraping elements keyed to the shaft;
    wherein the locking and compacting mechanism comprises a flat, perforated element traversed by a first end of the shaft and adapted to be applied abuttably from an exterior on a first extremity of the external mixing structure, where the first end passes through a first hole made in the first extremity, the flat, perforated element being joined to a perforated disc by a rod which passes through a first lateral hole of the first extremity and is slidably inserted into a tube fixed to the perforated disc, where the perforated disc is applied abuttably from the exterior on a second extremity, opposite to the first extremity, of the external mixing structure, the perforated disc being fixed to a second end of the shaft which passes through a second hole in the second extremity while the tube passes through a second lateral hole of the second extremity, where the scraping elements are positioned between the first extremity and the second extremity of the external mixing structure.

2. The stirring device according to claim 1, wherein each of the scraping elements comprises 1) a tubular portion with a polygonal internal cross section, adapted to be fitted by the prismatic coupling to the shaft, and 2) a helicoid stretch configured for scraping an inside surface of the container.

3. The stirring device according to claim 2, wherein the tubular portion has at least one protrusion on an edge of one end of the tubular portion and at least one indentation on another end of the tubular portion, the indentation being shaped to be coupled to the protrusion of an adjacent one of the scraping elements.

4. The stirring device according to claim 1, wherein the external mixing structure is substantially cylindrical in shape, where the first extremity comprises a first perforated plate including a series of protuberances adapted to engage a star-shaped element keyed to the shaft in order to transmit rotational motion of the shaft to the external mixing structure, and wherein the second extremity of the external mixing structure is a second perforated plate.

5. The stirring device according to claim 4, wherein the shaft includes a first end and a second end, and at the first end, a shoulder ring which, in an assembled configuration, abuts against the star-shaped element and presses the star-shaped element against the first perforated plate, and at the second end, a threaded hole in which a screw associated with the perforated disc is engaged in order to fasten and tighten the locking and compacting mechanism and the shaft.

6. The stirring device according to claim 5, and further comprising a butterfly element operatively connected to the perforated disc, the butterfly element engaging a head of the screw in order to tighten the screw in the threaded hole in the shaft.

7. A machine for making liquid or semi-liquid food products, comprising:
    the stirring device according to claim 1;

the container for processing the liquid or semiliquid product;

a refrigerating system comprising a heat exchanger operatively connected to the container to thermally process the liquid or semi-liquid product inside the container;

wherein the stirring device is mounted inside the container to stir the liquid or semi-liquid product inside the container;

a drive mechanism, including a motor connected to the stirring device to stir the liquid or semi-liquid product inside the container;

a dispenser configured for dispensing the liquid or semi-liquid product from the container.

\* \* \* \* \*